United States Patent
Sejimo (10) Patent No.: US 8,823,300 B2
(45) Date of Patent: Sep. 2, 2014

(54) ELECTRIC MOTOR CONTROL DEVICE

(75) Inventor: Isamu Sejimo, Chino (JP)

(73) Assignee: Seiko Epson Corporation (JP)

( * ) Notice: Subject to any disclaimer, the term of this patent is extended or adjusted under 35 U.S.C. 154(b) by 425 days.

(21) Appl. No.: 13/233,348

(22) Filed: Sep. 15, 2011

(65) Prior Publication Data

US 2012/0068639 A1    Mar. 22, 2012

(30) Foreign Application Priority Data

Sep. 16, 2010 (JP) .................................. 2010-208020

(51) Int. Cl.
*H02P 21/00* (2006.01)

(52) U.S. Cl.
USPC ....... 318/400.02; 318/432; 318/721; 318/799

(58) Field of Classification Search
CPC ...................................................... H02P 21/06
USPC ............. 318/400.01, 400.02, 400.07, 400.14, 318/400.15, 721, 799, 430, 432, 560; 388/800, 821
See application file for complete search history.

(56) References Cited

U.S. PATENT DOCUMENTS

| | | | |
|---|---|---|---|
| 7,235,947 B2 * | 6/2007 | Tanaka et al. | 318/712 |
| 7,336,050 B2 * | 2/2008 | Ihm | 318/714 |
| 2006/0108967 A1 | 5/2006 | Tanaka et al. | |
| 2009/0295316 A1 * | 12/2009 | Patel et al. | 318/400.02 |
| 2010/0109584 A1 * | 5/2010 | Kwon et al. | 318/400.02 |
| 2010/0148707 A1 * | 6/2010 | Tobari et al. | 318/400.02 |

FOREIGN PATENT DOCUMENTS

| | | |
|---|---|---|
| JP | 09-023697 | 1/1997 |
| JP | 11-178399 | 7/1999 |
| JP | 2002-320400 | 10/2002 |
| JP | 2006-141095 | 6/2006 |
| JP | 2006-158000 A | 6/2006 |
| JP | 2007-312462 | 11/2007 |
| JP | 2008-141824 | 6/2008 |

* cited by examiner

*Primary Examiner* — Antony M Paul
(74) *Attorney, Agent, or Firm* — Harness, Dickey & Pierce, P.L.C.

(57) ABSTRACT

An electric motor control device includes a control section adapted to control supply of a drive current to an electric motor, and a rotational speed detection section adapted to detect a rotational speed of the electric motor, the drive current includes a d-axis current and a q-axis current, and the control section calculates a q-axis current command value based on a torque command value to the electric motor, calculates a d-axis current command value using a difference between the rotational speed of the electric motor and a previously determined base rotational speed of the electric motor, and the q-axis current command value, and performs vector control on the electric motor using the d-axis current command value and the q-axis current command value.

6 Claims, 8 Drawing Sheets

ELECTRIC MOTOR CONTROL DEVICE

BACKGROUND

1. Technical Field

The present invention relates to electric motor control.

2. Related Art

Electric motors have load torque-rotational speed characteristics (T-N characteristics). The T-N characteristics are inherent to the electric motors, and basically the T-N characteristics of a certain electric motor is uniquely determined if the drive voltage is determined. However, the T-N characteristics can be changed using a control technology called field-weakening control (e.g., JP-A-2002-320400).

The conventional field-weakening control is realized by controlling the d-axis current to a negative value taking the speed and the load into consideration. However, since the voltage with which the electric motor is used depends on the use circumstances of the user, it is not achievable to sufficiently improve the T-N characteristics of the electric motor.

SUMMARY

An advantage of some aspects of the invention is to improve the T-N characteristics of an electric motor.

Application Example 1

This application example of the invention is directed to an electric motor control device including a control section adapted to control supply of a drive current to an electric motor, and a rotational speed detection section adapted to detect a rotational speed of the electric motor, wherein the drive current includes a d-axis current and a q-axis current, and the control section calculates a q-axis current command value as a target value of the q-axis current based on a torque command value to the electric motor, calculates a d-axis current command value as a target value of the d-axis current using a difference between the rotational speed of the electric motor and a previously determined base rotational speed of the electric motor, and the q-axis current command value, and performs vector control on the electric motor using the d-axis current command value and the q-axis current command value.

According to this application example of the invention, it is possible to increase the d-axis current command value in the high torque area where the improvement of the T-N characteristics is required to thereby improve the T-N characteristics.

Application Example 2

This application example of the invention is directed to the electric motor control device of the application example 1 of the invention, wherein, assuming that a gain coefficient is Kd, the q-axis current command value calculated based on the torque command value is Iqr, the rotational speed of the electric motor is $\omega$, and the base rotational speed of the electric motor is $\omega bs$, the d-axis current command value Idr is expressed as follows.

$$Idr = Kd \times Iqr \times (\omega - \omega bs)$$

Application Example 3

This application example of the invention is directed to the electric motor control device of the application example 1 of the invention, wherein assuming that a gain coefficient is Kd, the q-axis current command value calculated based on the torque command value is Iqr, a previously determined base q-axis current command value is Iqbs, the rotational speed of the electric motor is $\omega$, and the base rotational speed of the electric motor is $\omega bs$, the d-axis current command value Idr is expressed as follows.

$$Idr = Kd \times (Iqr - Iqbs) \times (\omega - \omega bs)$$

Application Example 4

This application example of the invention is directed to the electric motor control device of any one of the application examples 1 to 3 of the invention, wherein the control section sets the d-axis current command value to zero if the rotational speed of the electric motor is one of equal to and lower than the base rotational speed.

According to this application example of the invention, it becomes possible to prevent the degradation of the efficiency by suppressing the d-axis current command value to a low level in the low torque area or the case of the low rotational speed where no improvement of the T-N characteristics is required.

Application Example 5

This application example of the invention is directed to the electric motor control device of any one of the application examples 1 to 4 of the invention, wherein the control section varies the base rotational speed in proportion to a drive voltage of the electric motor.

Since the base rotational speed is varied in proportion to the drive voltage of the electric motor, it becomes possible to improve the T-N characteristics of the electric motor in proportion to the drive voltage.

Application Example 6

This application example of the invention is directed to the electric motor control device of the application example 5 of the invention, wherein the control section includes a storage section adapted to store one of a table and a relational expression representing a relationship between the drive voltage of the electric motor and the base rotational speed.

The invention can be realized in a variety of forms such as a method of controlling an electric motor besides the electric motor control device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Characteristics of Electric Motor

Figure 1:
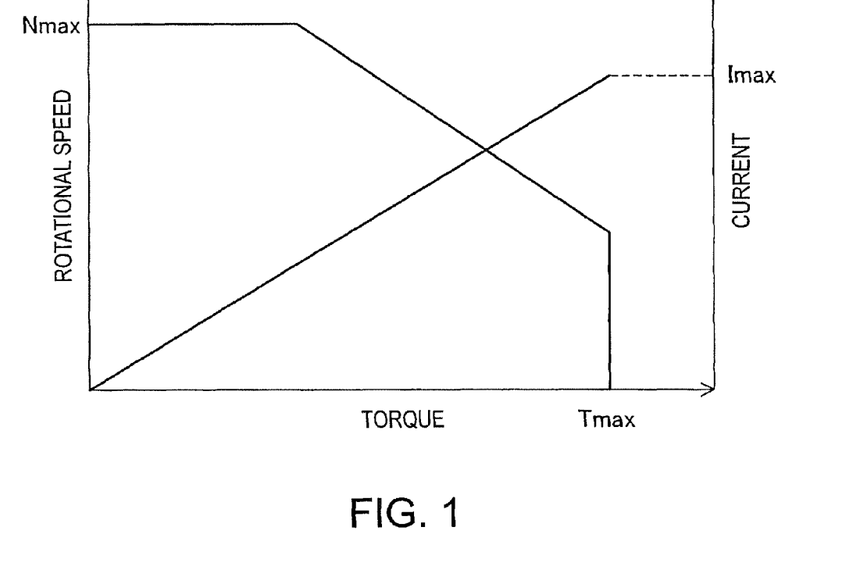
FIG. 1 is an explanatory diagram showing an example of the torque-current characteristics (the T-I characteristics) and the torque-rotational speed characteristics (the T-N characteristics) of an electric motor.

FIG. 1 is an explanatory diagram showing an example of the torque-current characteristics (the T-I characteristics) and the torque-rotational speed characteristics (the T-N characteristics) of an electric motor. In general, in a DC motor, there is a proportional relationship expressed by Formula 1 between the torque T of the electric motor and the current I of the electric motor.

$$T = K \times \phi \times I = Kt \times I \quad (1)$$

Here, "L" denotes a proportional constant determined by the structure of the electric motor, and "φ" denotes the flux [Wb] of a permanent magnet (not shown) of the electric motor. The product of the proportional constant K and the flux φ is defined as a torque constant Kt. Then, there is a proportional relationship expressed by Formula 2 between the torque T of the electric motor and the rotational speed N of the electric motor.

$$N = -K1 \times T + Nnl \quad (2)$$

In Formula 2, "K1" denotes a proportional constant, and "Nnl" denotes a no-load rotational speed. Here, the proportional constant K1 is expressed by Formula 3.

$$K1 = \frac{2\pi}{60} \times Rdc \times \left(\frac{Nnl}{Es - Rdc \times Inl}\right)^2 \quad (3)$$

In Formula 3, "Rdc" denotes an electrical resistance of a magnet coil (not shown) of the electric motor, "Es" denotes a drive voltage of the electric motor, and "Inl" denotes a no-load current.

In FIG. 1, as the rotational speed of the electric motor increases, a mechanical load increases. Since the mechanical load exceeds the torque T in the area of the rotational speed higher than the maximum rotational speed Nmax, it is not possible to drive the electric motor at a rotational speed higher than the maximum rotational speed Nmax. On the other hand, as shown in Formula 1, the current I is proportional to the torque T. Here, when the current I of the electric motor flows, the electric motor generates heat due to the Joule heat ($Q = I^2 \times Rdc$). If the Joule heat Q becomes excessively large, the electric motor might be damaged by the heat. Therefore, the torque T or the current I is limited so that the Joule heat Q does not exceed a certain level. The torque T on this occasion is called a maximum torque Tmax, and the current I on this occasion is called a maximum current Imax.

Figure 2:
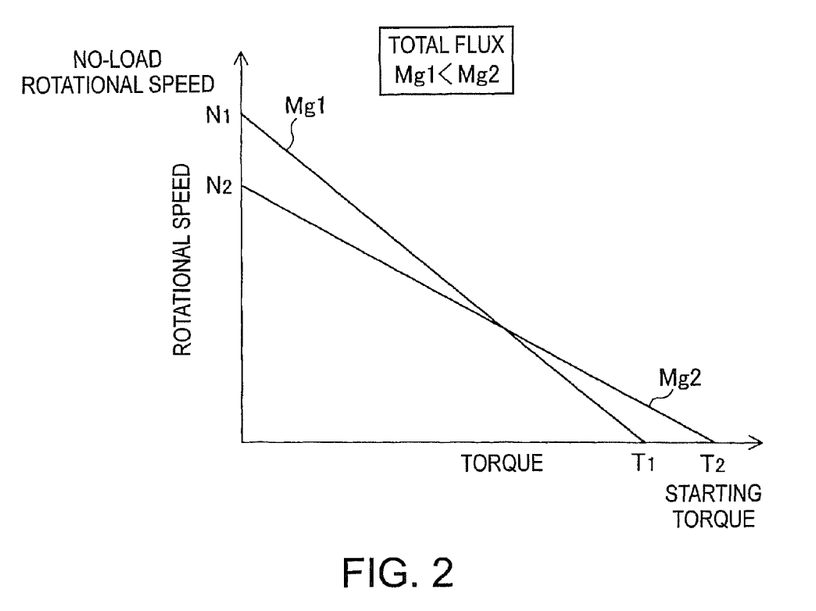
FIG. 2 is an explanatory diagram showing the T-N characteristics of electric motors different only in the flux of the permanent magnet.

FIG. 2 is an explanatory diagram showing the T-N characteristics of electric motors different only in the flux of the permanent magnet. As is obvious from the two characteristic graphs, the electric motor Mg2 with higher total flux has a lower no-load rotational speed (N1>N2) and a larger starting torque (T1<T2) compared to the electric motor Mg1 with lower total flux. In other words, the electric motor Mg1 with the lower total flux has a smaller starting torque and a higher no-load rotational speed. These are general characteristics of electric motors.

Figure 3:
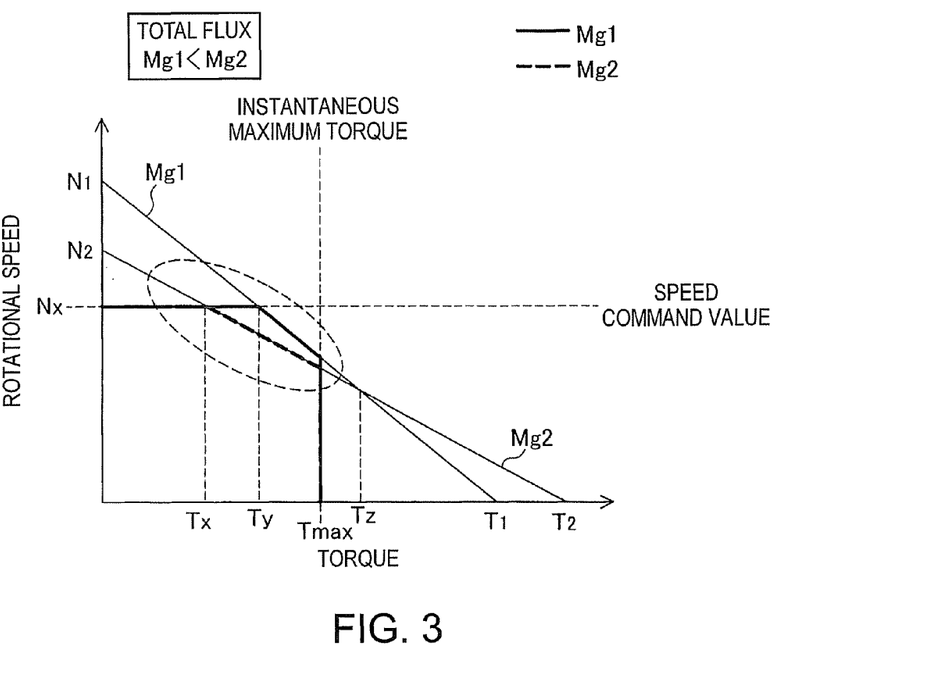
FIG. 3 is an explanatory diagram showing the T-N characteristics when changing the torque while performing the constant-speed control on the electric motors shown in FIG. 2.

FIG. 3 is an explanatory diagram showing the T-N characteristics when changing the torque while performing the constant-speed control on the electric motors shown in FIG. 2. In the area of the torque of 0 through Tx, since the constant-speed control is performed, the rotational speed of the electric motors Mg1, Mg2 is kept at Nx even when the torque increases. In the area of the torque of Tx through Ty (Tx<Ty), the rotational speed of the electric motor Mg2 is lower than Nx while the rotational speed of the electric motor Mg1 is kept unchanged at Nx. In the area of the torque of Ty through Tmax (Tmax<Tz; Tz denotes the torque at which the T-N curves of the respective electric motors Mg1, Mg2 intersect with each other), the rotational speed of both of the electric motors Mg1, Mg2 decreases as the torque increases. In this period, the rotational speed of the electric motor Mg1 with the lower flux is higher than that of the electric motor Mg2 with the higher flux at the same torque, and the torque of the electric motor Mg1 is higher than that of the electric motor Mg2 at the same rotational speed. In other words, by reducing the flux (field weakening), the T-N characteristics of the electric motor can be improved.

Figure 4:
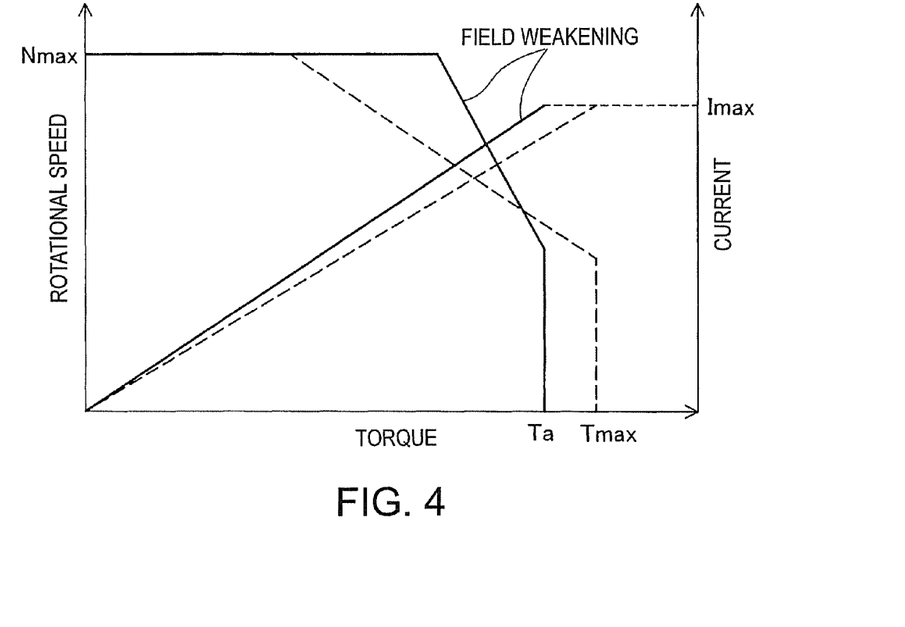
FIG. 4 is an explanatory diagram showing an example of the torque-current characteristics (the T-I characteristics) and the torque-rotational speed characteristics (the T-N characteristics) when performing the field-weakening control.

FIG. 4 is an explanatory diagram showing an example of the torque-current characteristics (the T-I characteristics) and the torque-rotational speed characteristics (the T-N characteristics) when performing the field-weakening control. In FIG. 4, the solid line represents the characteristics when the field weakening is performed, and the broken line represents the characteristics when the field weakening is not performed. The characteristics represented by the broken line coincide with the characteristics shown in FIG. 1. The field weakening control is for performing the control so as to reduce the flux φ of the permanent magnet. Therefore, according to Formula 1, the torque constant Kt is reduced (Kt=Kφ). Therefore, in the field weakening control, the current per unit torque increases. That is, in the field weakening control, the current I reaches the maximum current Imax at the torque Ta lower than the maximum torque Tmax, and the heat generation due to the Joule heat increases. Therefore, if the field weakening is performed, there occurs the case in which it is not achievable to operate the electrical motor at the maximum torque Tmax.

As described above, if the field weakening control is performed, the T-N characteristics of the electric motor can be improved. However, if the maximum current Imax is reached at the torque Ta smaller than the maximum torque Tmax, the control of increasing the torque of the electric motor beyond the torque Ta cannot be performed because of the heat generation due to the Joule heat. In the present embodiment, a variety of types of control for improving the T-N characteristics are performed to cope with the circumstances described above.

First Embodiment

Figure 5:
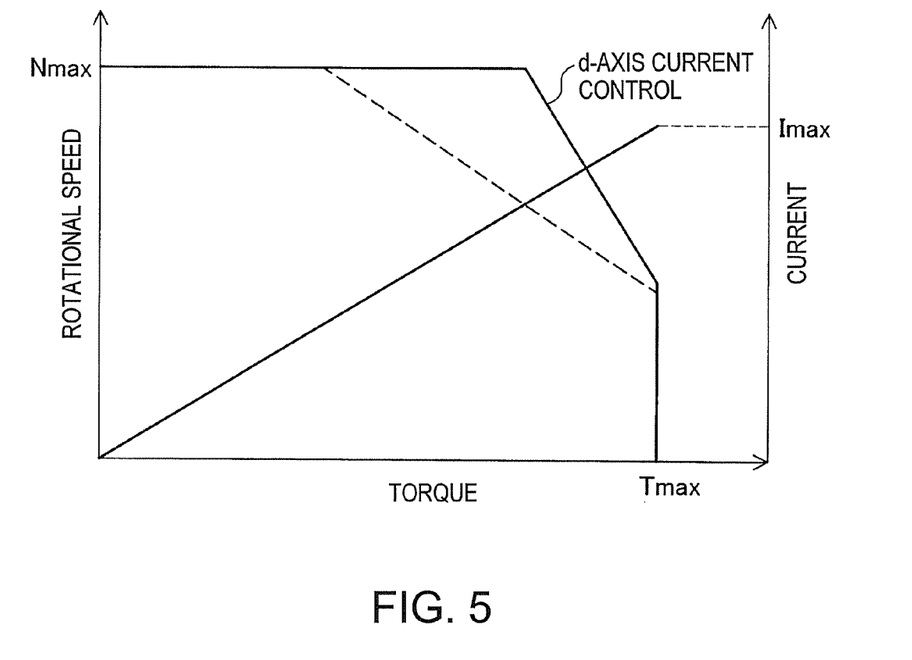
FIG. 5 is an explanatory diagram showing the T-N characteristics of an electric motor according to a first embodiment of the invention.

FIG. 5 is an explanatory diagram showing the T-N characteristics of an electric motor according to a first embodiment of the invention. In the first embodiment, d-axis current control is performed so that the current I does not reach the maximum current Imax until the torque T reaches the maximum torque Tmax. The drive current includes a d-axis current and a q-axis current, and in the vector control of the electric motor, the drive current is controlled by performing the feedback control based on the target values (a d-axis current command value and a q-axis current command value) of the d-axis current and the q-axis current. Taking the d-axis in the direction of the flux of the permanent magnet, the d-axis current represents the component (the excitation current component) used for generating the flux out of the drive current flowing therethrough, and the q-axis current represents the component corresponding to the load torque.

Figure 6:
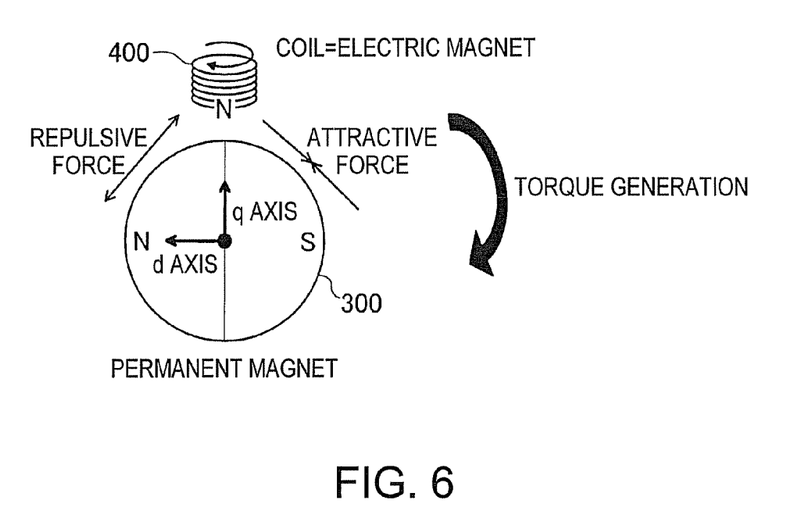
FIG. 6 is an explanatory diagram showing a q-axis current.

FIG. 6 is an explanatory diagram showing the q-axis current. In the case in which a magnet coil 400 is located in a direction of the q axis of the permanent magnet 300, a current is made to flow through the magnet coil 400 to thereby generate the torque for driving the electric motor. It should be noted that in FIG. 6 it is assumed that the magnet coil rotates.

Figure 7:
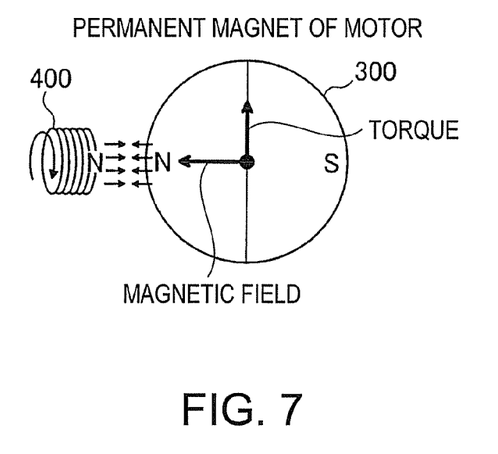
FIG. 7 is an explanatory diagram showing a d-axis current.

FIG. 7 is an explanatory diagram showing the d-axis current. In the case in which the magnet coil 400 is located in a direction of the d axis of the permanent magnet 300, a current is made to flow through the magnet coil 400 to thereby control the strength of the field generated by the permanent magnet 300. In the field weakening process, the field of the permanent magnet 300 is weakened. In the present embodiment, the field weakening process for weakening the field of the permanent magnet 300 is performed.

Figure 8:
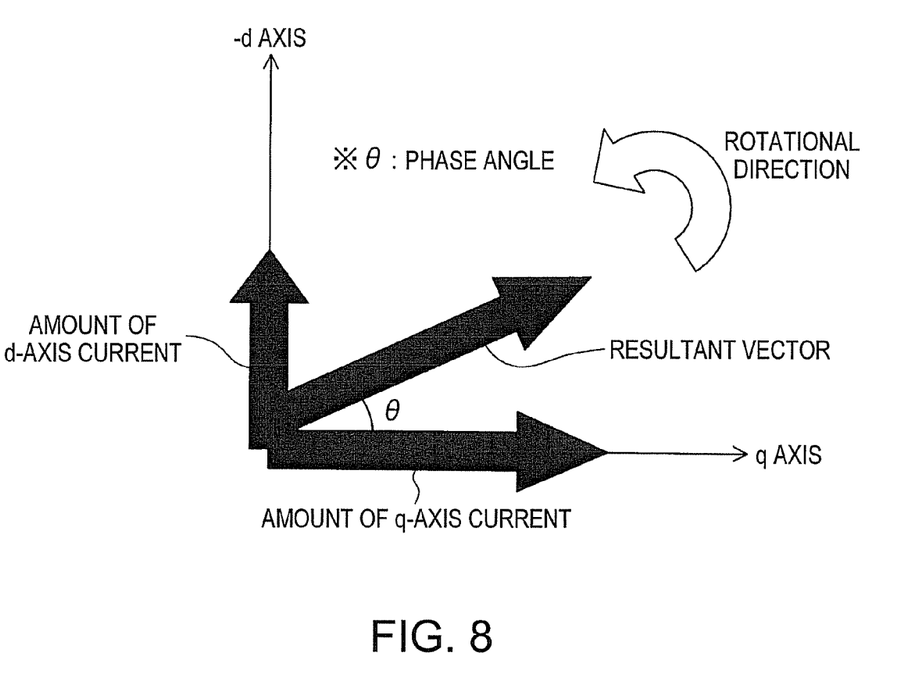
FIG. 8 is a vector diagram of the d-q axis.

FIG. 8 is a vector diagram of the d-q axis. The phase difference between the d axis and the q axis is 90 degrees. By taking the vector sum of the d-axis current and the q-axis current, a resultant vector is generated. The effective voltage value corresponding to the resultant vector is applied to the magnet coil 400. It should be noted that "θ" shown in the drawing denotes the phase angle with respect to the q axis, and represents the extent of the phase lead from the d axis (=0).

The T-N characteristics shown in FIG. 5 will be explained. In the present embodiment, the drive current Iall is detected, and is compared with the maximum current Imax set previously to thereby calculate the d-axis current command value. Thus, it becomes possible to execute the field weakening using the d-axis current to thereby improve the T-N characteristics, and at the same time, to provide the output with the torque up to the maximum torque Tmax without reaching the maximum current Imax.

Figure 9:
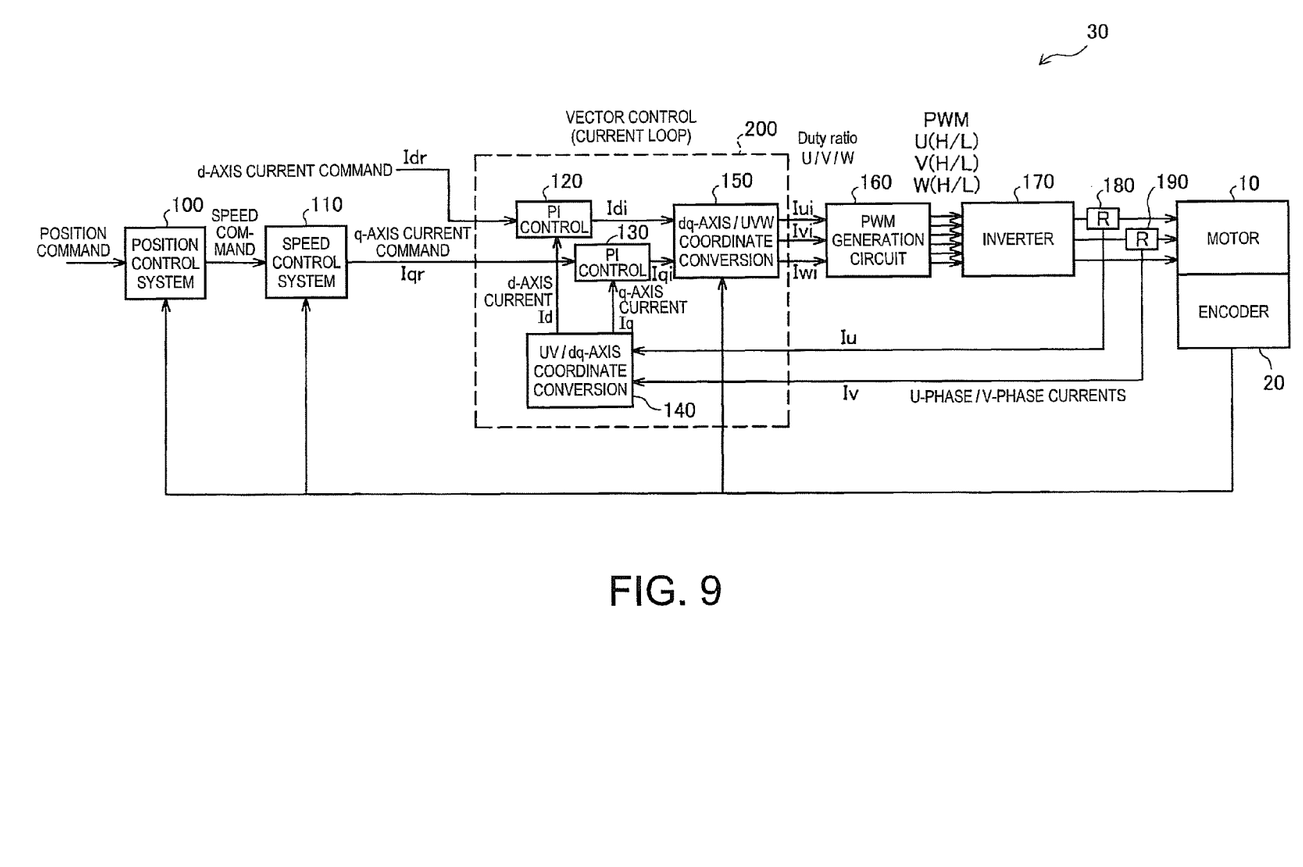
FIG. 9 is a block diagram of a control system according to the present embodiment.

FIG. 9 is a block diagram of a control system according to the present embodiment. An electric motor system according to the present embodiment is provided with an electric motor 10, an encoder 20, and a control block 30. The encoder 20 is used for detecting the speed and the position of a rotor (not shown) of the electric motor 10. The control block 30 controls the operation of the electric motor 10. The control block 30 is provided with a position control system block 100, a speed control system block 110, a d-axis current PI control block 120, a q-axis current PI control block 130, a UV/dq-axis coordinate conversion block 140, a dq-axis/UVW coordinate conversion block 150, a PWM drive signal generation circuit 160, an inverter circuit 170, a U-phase ampere meter 180, and a V-phase ampere meter 190. The d-axis current PI control block 120, the q-axis current PI control block 130, the UV/dq-axis coordinate conversion block 140, and the dq-axis/UVW coordinate conversion block 150 constitute a vector control block 200.

The position control system block 100 obtains the position information of the rotor of the electric motor 10 from the encoder 20, and further, transmits a speed command value to the speed control system block 110 based on a position command value. Here, the position command value is transmitted from a higher-level control device, not shown, using the electric motor. It should be noted that although in the present embodiment the higher-level control device is used, it is also possible to adopt a variety of devices or arithmetic units providing they are the arithmetic units adapted to calculate the position command value.

The speed control system block 110 obtains the rotational speed information of the rotor of the electric motor 10 from the encoder 20, and further, transmits a q-axis current command value Iqr to the q-axis current PI control block 130 based on the speed command value transmitted from the position control system block 100.

The UV/dq-axis coordinate conversion block 140 calculates the d-axis current Id and the q-axis current Iq based on a U-phase current value Iu from the U-phase ampere meter 180 and a V-phase current value Iv from the V-phase ampere meter 190. It should be noted that since a three-phase motor is used in the present embodiment, a W-phase current Iw also exists. Although it is possible to provide a W-phase ampere meter to thereby measure the W-phase current Iw, it is also possible to calculate the W-phase current Iw using the U-phase current value Iu and the V-phase current value Iv. Specifically, the W-phase current Iw can be calculated as Iw=−Iv−Iu. The d-axis current Id is transmitted to the d-axis current PI control block 120, and the q-axis current Iq is transmitted to the q-axis current PI control block 130.

The d-axis current PI control block 120 performs the PI control using the d-axis current command value Idr, and the d-axis current Id transmitted from the UV/dq-axis coordinate conversion block 140, and then outputs a d-axis current control value Idi. How the d-axis current command value Idr is determined will be described later. The PI control is a kind of feedback control, and in the PI control, the proportional control (the P control) and the integral control (the I control) are executed based on the difference between the target value (the d-axis current command value Idr) and the output value (the d-axis current Id). It should be noted that although the PI control is used in the present embodiment, the PID control further including the differential control (the D control) can also be adopted. The q-axis current PI control block 130 performs the PI control using the q-axis current command value Iqr, and the q-axis current Iq transmitted from the UV/dq-axis coordinate conversion block 140, and then outputs a q-axis current control value Iqi.

The dq-axis/UVW coordinate conversion block 150 outputs a U-phase current control value Iui, a V-phase current control value Ivi, and a W-phase current control value Iwi based on the d-axis current control value Idi from the d-axis current PI control block 120 and the q-axis current control value Iqi from the q-axis current PI control block 130.

The PWM drive signal generation circuit 160 outputs PWM drive signals PWMUH, PWMUL, PWMVH, PWMVL, PWMWH, and PWMWL based on the U-phase current control value Iui, the V-phase current control value Ivi, and the W-phase current control value Iwi. The inverter circuit 170 has, for example, a three-phase bridge circuit (not shown), and applies voltages to the magnet coils of the electric motor 10 based on the PWM drive signals PWMUH, PWMUL, PWMVH, PWMVL, PWMWH, and PWMWL.

Figure 10:
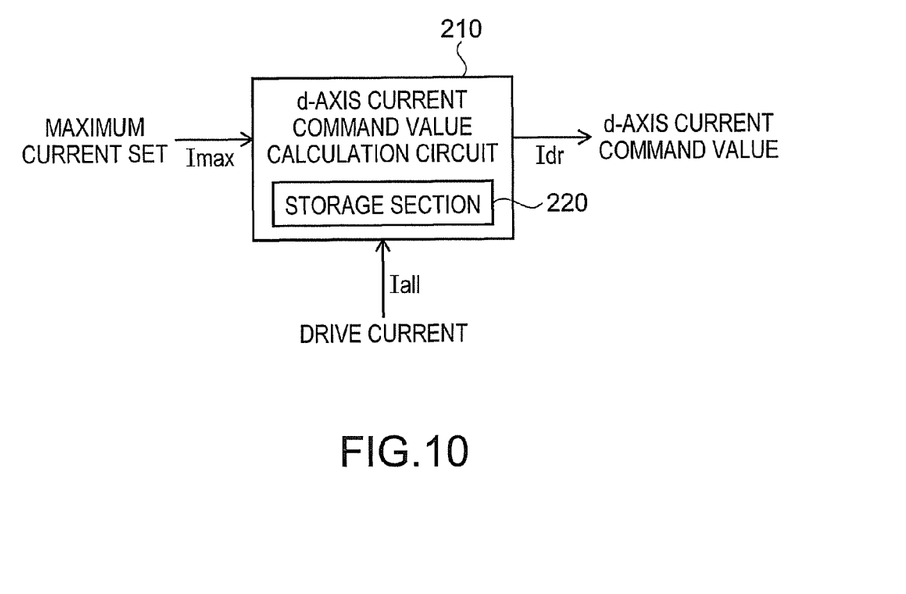
FIG. 10 is an explanatory diagram showing a d-axis current command value calculation circuit.

FIG. 10 is an explanatory diagram showing a d-axis current command value calculation circuit. The d-axis current command value calculation circuit 210 is disposed in the anterior stage of the d-axis current PI control block 120 shown in FIG. 9. The d-axis current command value calculation circuit 210 has a storage section 220, and the storage section 220 stores various relational expressions (the formulas described later) and data for calculating the d-axis current command value. The d-axis current command value calculation circuit 210 outputs the d-axis current command value Idr using the maximum current Imax and the drive current Iall. Here, the maximum current Imax is the current limit value described above. The drive current Iall is calculated with Formula 4 described below using the d-axis current Id and the q-axis current Iq.

$$Iall = \sqrt{Id^2 + Iq^2} \quad (4)$$

Although in the present embodiment the drive current Iall is used as the input to the d-axis current command value calculation circuit 210, it is also possible to use the d-axis current Id and the q-axis current Iq instead of the drive current Iall.

The calculation of the d-axis current command value will hereinafter be explained. The d-axis current command value calculation circuit 210 firstly compares the drive current Iall and the maximum current Imax with each other. If the drive current Iall is smaller than the maximum current Imax, the d-axis current command value calculation circuit 210 calculates the d-axis current command value Idr using Formula below.

$$Idr = (Imax - Iall) \times Ka \quad (5)$$

Here, the coefficient Ka (Ka≤0) is a control gain, and has been obtained previously by an experiment.

In contrast, if the drive current Iall is equal to or larger than the maximum current Imax, the d-axis current command value calculation circuit 210 calculates the d-axis current command value Idr using Formula 6 below.

$$Idr = (Iall - Imax) \times Kb \quad (6)$$

Here, the coefficient Kb (Kb<0) is a control gain, and has been obtained previously by an experiment. In Formula 6, by reducing the d-axis current command value Idr, the absolute value of the d-axis current Id is reduced, and the drive current Iall is reduced to be equal to or lower than the maximum current Imax.

According to the present embodiment, if the drive current Iall is smaller than the maximum current Imax, the d-axis current command value calculation circuit 210 calculates the d-axis current command value Idr based on Formula 5, and the control block 30 executes the field weakening control based on the d-axis current command value Idr. If the drive current Iall is equal to or larger than the maximum current Imax, the d-axis current command value calculation circuit 210 reduces the absolute value of the d-axis current command value Idr based on Formula 6 to thereby reduce the absolute value of the d-axis current Id. As a result, it becomes possible for the electric motor 10 to output the torque up to the maximum torque Tmax without reaching the maximum current Imax.

Modified Example

Figure 11:
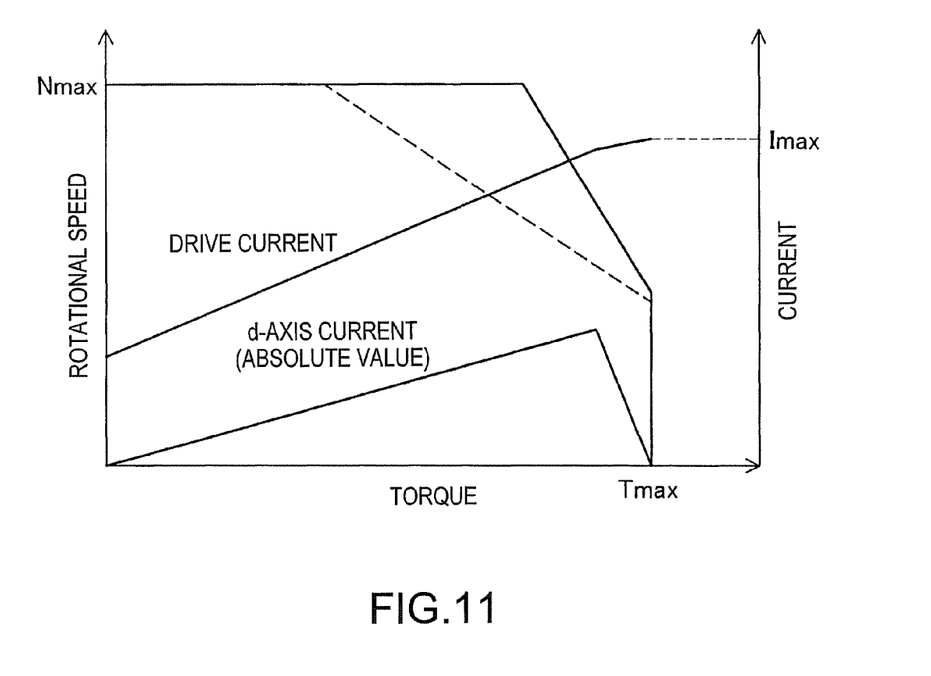
FIG. 11 is an explanatory diagram showing the T-N characteristics in a modified example of the first embodiment.

FIG. 11 is an explanatory diagram showing the T-N characteristics in a modified example of the first embodiment. In this modified example, if the drive current Iall is equal to or larger than the maximum current Imax, the d-axis current command value calculation circuit 210 calculates the d-axis current command value Idr based on Formula 7.

$$Idr = \sqrt{Imax^2 - Iqr^2} \quad (7)$$

Here, the q-axis current command value Iqr is calculated based on the torque command value required to the electric motor 10.

According to the present modified example, if the drive current Iall is smaller than the maximum current Imax, and the drive current Iall has enough margin, the d-axis current command value calculation circuit 210 calculates the d-axis current command value Idr based on Formula 5, and the control block 30 executes the field weakening control based on the d-axis current command value Idr. Further, if the drive current Iall almost reaches the set maximum current Imax, the d-axis current command value calculation circuit 210 reduces the absolute value of the d-axis current in accordance with the value of the drive current Iall. As a result, it becomes possible for the electric motor 10 to output the torque up to the maximum torque Tmax without reaching the maximum current Imax.

Although in the modified example the d-axis current command value calculation circuit 210 calculates the d-axis current command value Idr and the q-axis current command value Iqr using the drive current Iall, it is also possible to calculate the d-axis current command value Idr and the q-axis current command value Iqr using the U-phase current Iu, the V-phase current Iv, and the W-phase current Iw, or the d-axis current Id and the q-axis current Iq instead of the drive current Iall. Further, it is also possible for the d-axis current command value calculation circuit 210 to calculate the d-axis current command value Idr and the q-axis current command value Iqr using the torque command value and the torque of the electric motor.

Second Embodiment

Figure 12:
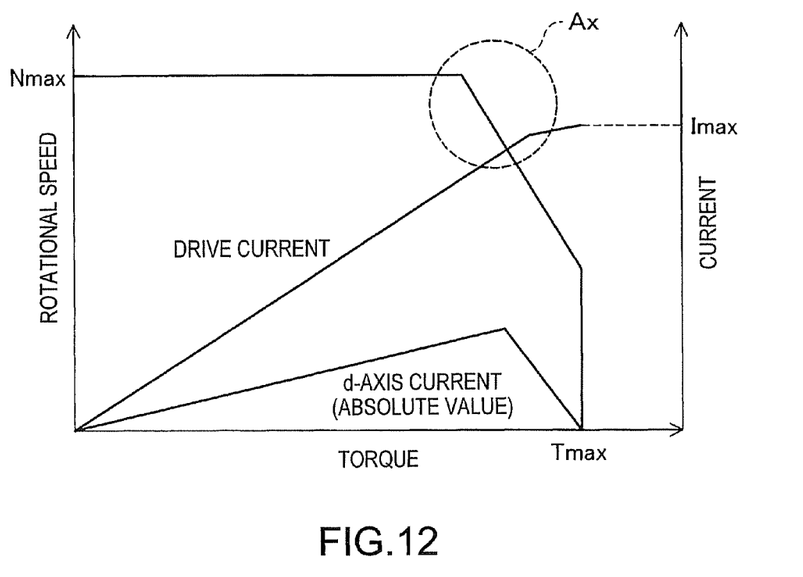
FIG. 12 is an explanatory diagram showing the T-N characteristics of an electric motor according to a second embodiment of the invention.

FIG. 12 is an explanatory diagram showing the T-N characteristics of an electric motor according to a second embodiment of the invention. In the second embodiment, regarding the d-axis current command value Idr, the torque T is multiplied by the control gain to thereby make the d-axis current command value Idr proportional to the torque, and thus the d-axis current control is performed so that the current is not limited until the torque reaches the maximum torque Tmax set previously. Formula 8 is an arithmetic expression for calculating the d-axis current command value Idr in the second embodiment.

$$Idr = Kc \times T \quad (8)$$

In Formula 8, "Kc" denotes the control gain, and can be obtained by an experiment. Further, "T" denotes the torque of the electric motor 10.

In the second embodiment, the control of suppressing the d-axis current control value to a low level prevents the degradation of the efficiency in the low torque area or in the case of the low rotational speed where no improvement of the T-N characteristics is required, and at the same time, increasing the d-axis current command value Idr in the area Ax where the d-axis current is necessary becomes possible. It should be noted that it is preferable that if the drive current Iall reaches the maximum current Imax, the d-axis current command value calculation circuit 210 controls the d-axis current command value Idr similarly to the first embodiment, and the control block 30 performs the control so that the maximum current Imax is not reached at the torque equal to or lower than the maximum torque Tmax.

Modified Example

Although in the second embodiment the torque T is multiplied by the control gain Kc to thereby make the d-axis current command value Idr proportional to the torque, it is also possible for the d-axis current command value calculation circuit 210 to multiply both of the torque T and the speed ω by the control gain Kc to thereby make the d-axis current command value Idr proportional to the torque as expressed by Formula 9.

$$Idr = Kc \times T \times \omega \tag{9}$$

Also by calculating the d-axis current command value Idr in such a manner as described above, it becomes possible to perform the control in which the d-axis current command value calculation circuit 210 suppresses the d-axis current control value Idr to a low level to thereby prevent the degradation of the efficiency in the low torque area or in the case of the low rotational speed where no improvement of the T-N characteristics is required, and at the same time, increases the d-axis current command value Idr in the area Ax where the d-axis current is necessary.

It should be noted that although in the second embodiment and the modified example of the second embodiment the d-axis current command value calculation circuit 210 uses the torque T of the electric motor 10 when calculating the d-axis current command value Idr, it is also possible to use the torque command value required to the electric motor 10.

Third Embodiment

Figure 13:
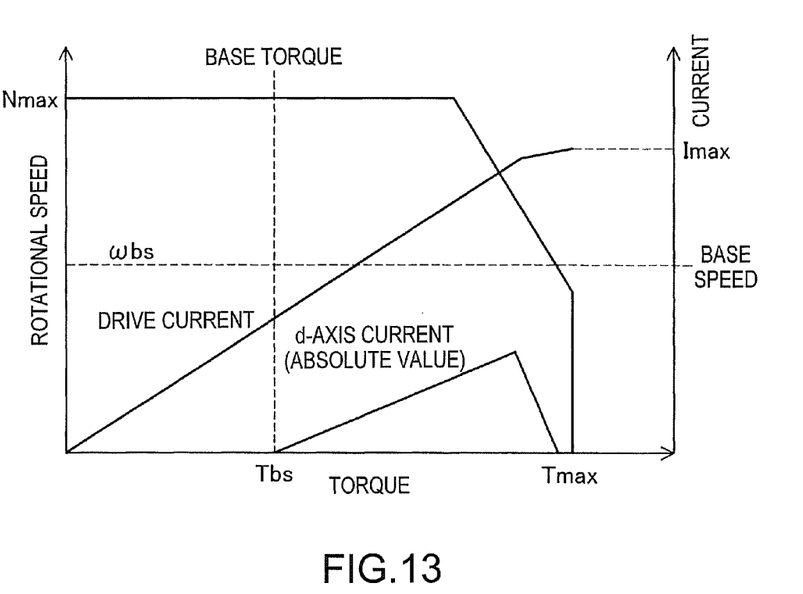
FIG. 13 is an explanatory diagram showing the T-N characteristics of an electric motor according to a third embodiment of the invention.

FIG. 13 is an explanatory diagram showing the T-N characteristics of an electric motor according to a third embodiment of the invention. In the third embodiment, as expressed by Formula 10, the d-axis current command value calculation circuit 210 calculates the q-axis current command value Iqr based on the torque command value to the electric motor 10, and then, calculates the d-axis current command value Idr by multiplying the difference (ω−ωbs) between the rotational speed ω of the electric motor and the previously determined base rotational speed ωbs of the electric motor, the q-axis current command value Iqr, and the control gain by each other.

$$Idr = Kd \times Iqr \times (\omega - \omega bs) \tag{10}$$

In Formula 10, "Kd" denotes the control gain, and can be obtained by an experiment. It should be noted that in the present embodiment the d-axis current command value calculation circuit 210 sets the d-axis current command value Idr to zero if the torque is equal to or lower than the previously determined base torque Tbs.

In the present embodiment, the d-axis current command value calculation circuit 210 increases the d-axis current command value Idr if the torque is equal to or higher than the previously determined base torque, and the rotational speed ω of the electric motor 10 is equal to or higher than the previously determined base rotational speed ωbs. It should be noted that the d-axis current command value calculation circuit 210 set the d-axis current command value Idr to zero if the torque further increases, and the rotational speed ω of the electric motor 10 becomes lower than the previously determined base rotational speed ωbs. It should be noted that if the base torque is used, the d-axis current command value Idr is set to zero also in the case in which the torque is equal to or lower than the base torque, in a similar manner. It should be noted that it is preferable that if the drive current Iall reaches the maximum current Imax, the d-axis current command value calculation circuit 210 controls the d-axis current command value Idr similarly to the first and second embodiments, to thereby perform the control so that the maximum current Imax is not reached at the torque equal to or lower than the maximum torque Tmax.

According to the present embodiment, it is possible for the d-axis current command value calculation circuit 210 to suppress the d-axis current command value Idr to a low level to thereby prevent the degradation of the efficiency in the low torque area or the case of the low rotational speed where no improvement of the T-N characteristics is required, and at the same time, increase the d-axis current command value Idr to thereby improve the T-N characteristics in the high torque area where the improvement of the T-N characteristics is required.

Modified Example

Figure 14:
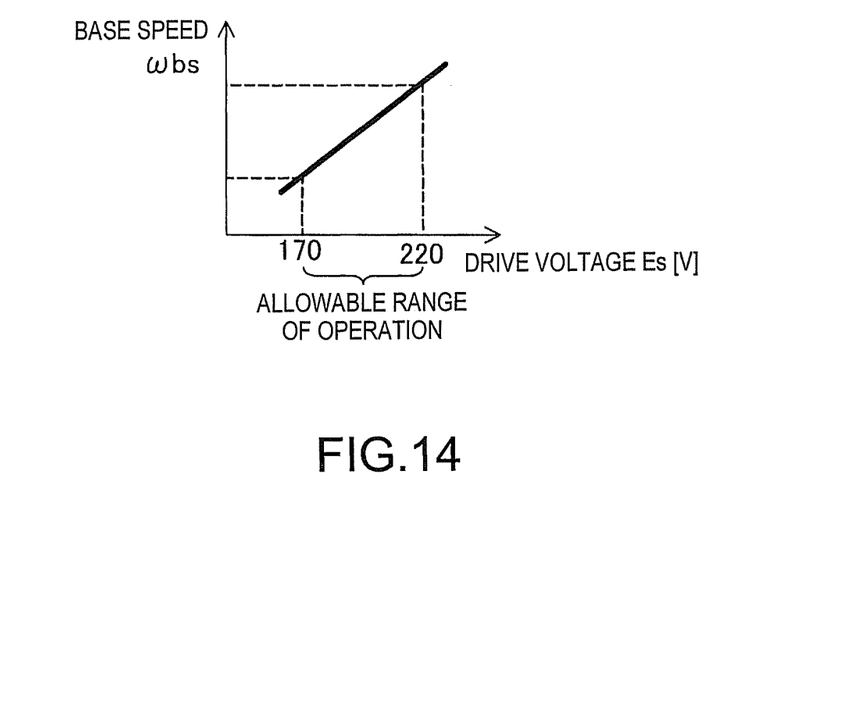
FIG. 14 is an explanatory diagram showing a modified example of the third embodiment.
Figure 15:
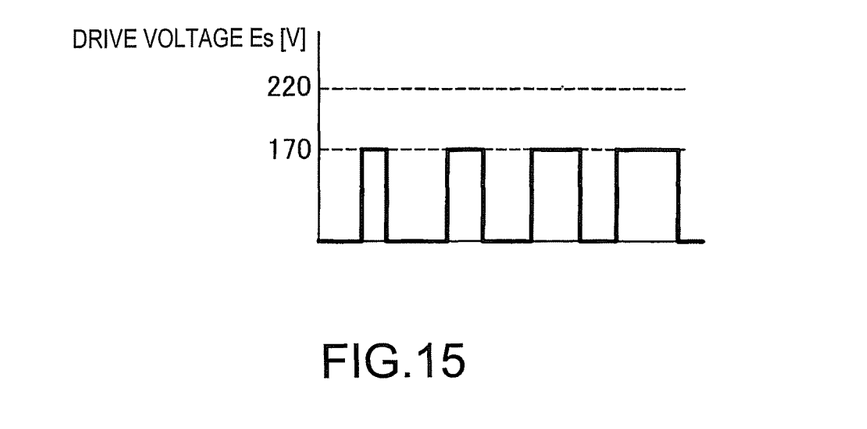
FIG. 15 is an explanatory diagram showing drive pulses of PWM drive.

FIG. 14 is an explanatory diagram showing a modified example of the third embodiment. In this modified example, the d-axis current command value calculation circuit 210 varies the base rotational speed ωbs in accordance with the drive voltage Es of the electric motor 10. The relationship between the drive voltage Es of the electric motor 10 and the base rotational speed ωbs is stored in the storage section 220 of the d-axis current command value calculation circuit 210. Here, the drive voltage denotes a direct-current voltage forming the base of the PWM drive. FIG. 15 is an explanatory diagram showing an example of drive pulses of the PWM drive. The height (the voltage) of the drive pulses of the PWM drive corresponds to the drive voltage Es of the electric motor 10. In the example shown in FIG. 15, the electric motor 10 is operated with the drive voltage of 170V. When, for example, the drive voltage increases along the graph shown in FIG. 14, the d-axis current command value calculation circuit 210 increases the base rotational speed ωbs. In this case, if, for example, the drive voltage drops, the base rotational speed ωbs decreases. Then, since (ω−ωbs) increases, it becomes possible for the d-axis current command value calculation circuit 210 to increase the d-axis current command value Idr to thereby improve the T-N characteristics of the electric motor. Further, the user of the electric motor can operate the electric motor 10 with the drive voltage within the range defined in the specification. According to the present embodiment, since the d-axis current command value calculation circuit 210 changes the base rotational speed ωbs based on the drive voltage actually used by the user, and then changes the d-axis current command value Idr, it becomes possible to improve the T-N characteristics of the electric motor at every drive voltage. It should be noted that although FIG. 14 shows the graph as if the drive voltage Es and the base rotational speed ωbs were in a proportional relationship, it is sufficient that the drive voltage Es and the base rotational speed ωbs correspond to each other, and it is not necessarily required that the drive voltage Es and the base rotational speed ωbs are in the proportional relationship. Further, the relationship can be obtained by an experiment. The value of the control gain Kd in Formula 10 can also be set variably in accordance with the drive voltage Es.

It should be noted that although in the third embodiment and the modified example thereof the d-axis current command value calculation circuit 210 calculates the d-axis current command value Idr using the q-axis current command value Iqr, the d-axis current command value Idr can also be calculated using the difference (Iqr−Iqbs) between the q-axis current command value Iqr and a previously determined base q-axis current Iqbs as expressed by Formula 11.

$$Idr = Kd \times (Iqr - Iqbs) \times (\omega - \omega bs) \quad (11)$$

It should be noted that in Formula 11 the base rotational speed ωbs can also be set variably in accordance with the drive voltage Es of the electric motor 10, and in addition, the values of the control gain Kd and the base q-axis current Iqbs can also be set variably in accordance with the drive voltage Es.

It is also possible to apply Formula 12 to each of the embodiments described above to thereby limit the level of the d-axis current command value Idr.

$$|Idr| = \sqrt{Imax^2 - Iqr^2} \quad (12)$$

Further, in each of the embodiments described above, if $Iqr^2 + Idr^2 > Imax$ is fulfilled, the drive current Iall can also be limited by setting $Iqr = \sqrt{(Imax^2 - Idr^2)}$.

Although in each of the embodiments described above the explanation is presented taking the three-phase motor as an example, the embodiments can be applied not only to the three-phase motor, but also to a two-phase motor or a multi-phase motor with three phases or more providing the motor uses the permanent magnet.

Although the embodiments of the invention are hereinabove explained based on some specific examples, the embodiments of the invention described above are only for making it easy to understand the invention, but not for limiting the scope of the invention. It is obvious that the invention can be modified or improved without departing from the scope of the invention and the appended claims, and that the invention includes the equivalents thereof.

The present application claims the priority based on Japanese Patent Applications No. 2010-208020 filed on Sep. 16, 2010, the disclosures of which are hereby incorporated by reference in their entireties.

What is claimed is:

1. An electric motor control device comprising:
a control section adapted to control supply of a drive current to an electric motor; and
a rotational speed detection section adapted to detect a rotational speed of the electric motor,
wherein the drive current includes a d-axis current and a q-axis current, and
the control section
calculates a q-axis current command value based on a torque command value to the electric motor,
calculates a d-axis current command value using a difference between the rotational speed of the electric motor and a previously determined base rotational speed of the electric motor, and the q-axis current command value,
performs vector control on the electric motor using the d-axis current command value and the q-axis current command value,
assuming that a gain coefficient is Kd, the q-axis current command value calculated based on the torque command value is Iqr, the rotational speed of the electric motor is ω, and the base rotational speed of the electric motor is ωbs, and
the d-axis current command value Idr is expressed as follows $$Idr = Kd \times Iqr \times (\omega - \omega bs).$$

2. The electric motor control device according to claim 1, wherein
assuming that the gain coefficient is Kd, the q-axis current command value calculated based on the torque command value is Iqr, a previously determined base q-axis current command value is Iqbs, the rotational speed of the electric motor is ω, and the base rotational speed of the electric motor is ωbs,
the d-axis current command value Idr is expressed as follows $$Idr = Kd \times (Iqr - Iqbs) \times (\omega - \omega bs).$$

3. The electric motor control device according to claim 1, wherein
the control section sets the d-axis current command value to zero if the rotational speed of the electric motor is one of equal to and lower than the base rotational speed.

4. The electric motor control device according to claim 1, wherein
the control section varies the base rotational speed ωbs in proportion to a drive voltage of the electric motor.

5. The electric motor control device according to claim 4, wherein
the control section includes a storage section adapted to store one of a table and a relational expression representing a relationship between the drive voltage of the electric motor and the base rotational speed ωbs.

6. An electric motor control device comprising:
a control section adapted to control supply of a drive current to an electric motor; and
a rotational speed detection section adapted to detect a rotational speed of the electric motor,
wherein the drive current includes a d-axis current and a q-axis current, and
the control section
calculates a q-axis current command value as a predetermined value of the q-axis current based on a torque command value to the electric motor,
calculates a d-axis current command value as a predetermined value of the d-axis current using a difference between the rotational speed of the electric motor and a base rotational speed of the electric motor, and the q-axis current command value,
performs vector control on the electric motor using the d-axis current command value and the q-axis current command value,
assuming that a gain coefficient is Kd, the q-axis current command value calculated based on the torque command value is Iqr, a previously determined base q-axis current command value is Iqbs, the rotational speed of the electric motor is ω, and the base rotational speed of the electric motor is ωbs, and
the d-axis current command value Idr is expressed as follows $$Idr = Kd \times (Iqr - Iqbs) \times (\omega - \omega bs).$$

* * * * *